United States Patent
Turner

[11] Patent Number: 5,978,424
[45] Date of Patent: Nov. 2, 1999

[54] FRAME IDENTIFICATION SYSTEM

[75] Inventor: Rudolf Turner, Hawthorn Woods, Ill.

[73] Assignee: Zenith Electronics Corporation, Glenview, Ill.

[21] Appl. No.: 08/751,895

[22] Filed: Nov. 18, 1996

[51] Int. Cl.$^6$ .............................. H04L 7/00; H04N 7/04
[52] U.S. Cl. ........................................ 375/368; 348/495
[58] Field of Search ........................ 348/471, 472, 348/495, 500, 526, 470, 474, 432; 375/342, 364, 367, 365, 366, 368; 370/515, 514

[56] References Cited

U.S. PATENT DOCUMENTS

| | | | |
|---|---|---|---|
| 3,854,011 | 12/1974 | Mallory et al. | 375/367 |
| 3,895,349 | 7/1975 | Robson | 375/367 |
| 5,008,751 | 4/1991 | Wischermann . | |
| 5,060,067 | 10/1991 | Lee et al. | 358/167 |
| 5,121,205 | 6/1992 | Ng et al. . | |
| 5,229,847 | 7/1993 | Gibson . | |
| 5,260,793 | 11/1993 | Citta et al. . | |
| 5,534,938 | 7/1996 | Citta | 348/495 |
| 5,619,269 | 4/1997 | Lee et al. . | |

FOREIGN PATENT DOCUMENTS

WO9631963 10/1996 WIPO .

*Primary Examiner*—Stephen Chin
*Assistant Examiner*—Albert Park

[57] ABSTRACT

A digital television signal includes successive frames of two fields each comprising 313 data segments with the first data segment in each field functioning as a field sync. The field sync segment comprises a 511 PN sequence and three 63 pseudo-random number (PN) sequences, with the middle one of the 63 PN sequences alternating polarity in successive fields. A reference data segment is compared with the 511 PN sequence in each data segment and the data segment with the least number of errors is identified as the first data segment in the field. The corresponding portion of the reference segment is compared with the middle 63 PN sequences in the identified first data segments and that with the least number of errors is determined to be the first segment in the frame. Confidence counters are used to assure reliable determinations.

12 Claims, 3 Drawing Sheets

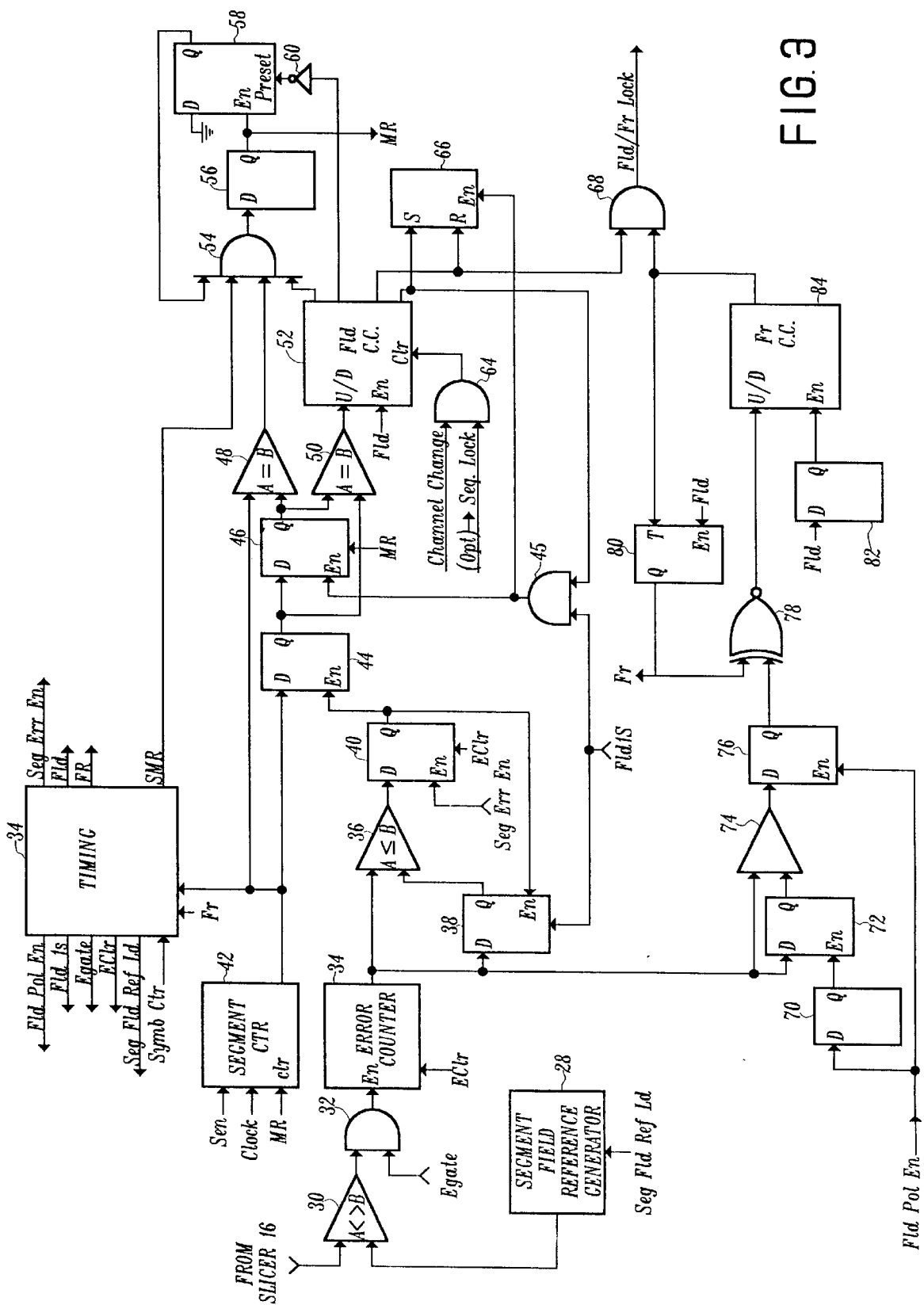

FRAME IDENTIFICATION SYSTEM

REFERENCE TO RELATED PATENT APPLICATION

This application is related to application Ser. No. 481,664 filed Jun. 7, 1995 entitled FRAME SYNC SIGNAL FOR DIGITAL TRANSMISSION SYSTEM, now U.S. Pat. No. 5,619,269, issued Apr. 8, 1997 and assigned to the assignee of the present application.

BACKGROUND OF THE INVENTION AND PRIOR ART

This invention relates in general to television receivers and in particular to a field identification system used in a digital television receiver.

The Advanced Television System (ATV) recently adopted by the FCC for use in the United States for both high definition television (HDTV) and lower resolution HDTV signals incorporates vestigial sideband (VSB) transmission. The VSB transmission system is characterized in both the terrestrial and cable modes by a data frame that comprises two data fields of 313 data segments each with each data segment comprising 832 multilevel symbols. The first data segment in each field comprises a data field sync segment and each data segment is headed by a four symbol data segment sync followed by 828 data and forward error correction symbols. (At present, the data field sync segments do not include forward error correction symbols.) The field and segment sync symbols facilitate recovery of the data in the ATV receiver and provide timing signals for the fields and segments. Each field sync segment also includes information identifying the VSB mode.

The transmission is via suppressed carrier modulation. Three hundred and ten kilohertz from the lower band edge, a small DC pilot is added to the signal for use by the VSB receiver in achieving carrier lock. The data and forward error correction (FEC) bytes are randomized and interleaved for added protection against burst errors.

The symbol rate is approximately 10.76 MHz. The sync symbols are always two level. In the terrestrial mode, 8 level trellis-coded symbols (3 bits per symbol) are transmitted, whereas in the cable mode, 16/8/4/2 level symbols (4/3/2/1 bits per symbol, respectively) are used.

As mentioned, each field is headed by a data field sync segment. As is fully described in the above-referenced copending application, the data field sync segment is characterized by a relatively long (511 symbol) pseudo-random number sequence followed by three relatively short (63 symbol) pseudo-random number sequences with the middle one of the short pseudo-random number sequences alternating in polarity in successive fields. Both the relatively long pseudo-random number sequence and the three relatively short pseudo-random number sequences are used as an equalizer training signal in terrestrial broadcast applications and one of the relatively short pseudo-random number sequences is used as an equalizer training signal in more benign applications, such as in a cable environment.

In some applications it is advantageous to be able to identify the first field in a frame. The presence of the reverse polarity middle 63 pseudo-random number (PN) sequence is used in the present invention for that purpose.

OBJECTS OF THE INVENTION

A principal object of the invention is to provide a novel field identification system.

Another object of the invention is to provide a simple, low cost method of identifying the initial field of a two field frame.

BRIEF DESCRIPTION OF THE DRAWING

These and other objects and advantages of the invention will be apparent upon reading the following description thereof in conjunction with the drawings, in which:

FIG. 3 is a simplified schematic diagram of the invention; and

DESCRIPTION OF THE PREFERRED EMBODIMENT

Figure 1:
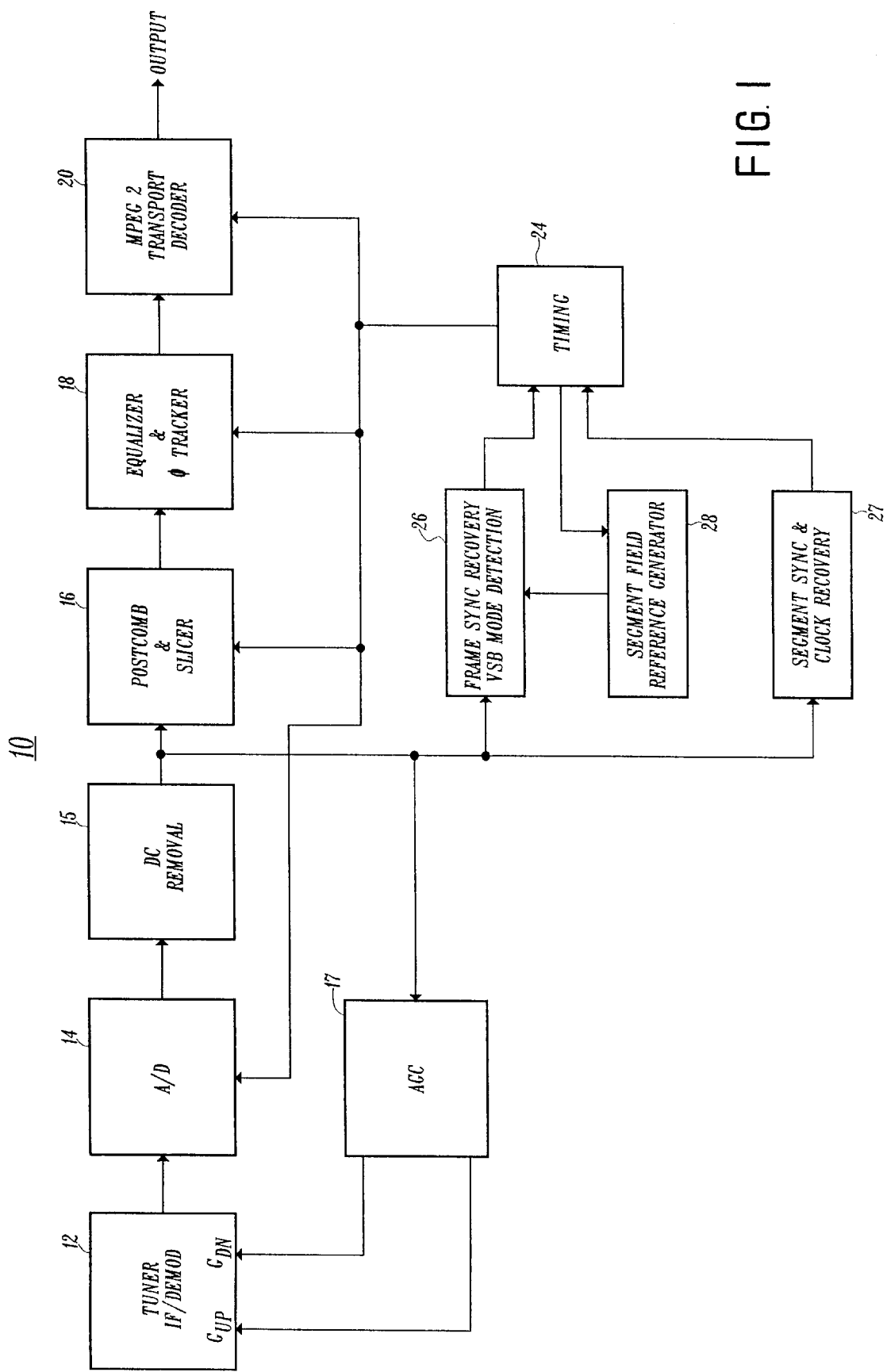
FIG. 1 is a simplified block diagram of a television receiver incorporating the invention.

FIG. 1 illustrates a television receiver 10 constructed in accordance with the invention. A tuner/IF and demodulator 12 receives a multilevel digital signal, either terrestrially or via a cable, converts it to an intermediate frequency signal, demodulates it and supplies the demodulated signal to an analog-to-digital (A/D) converter 14 where the signal is converted to a series of corresponding symbol levels. A/D 14 supplies the signal to a DC removal circuit 15 where the DC in the signal is removed. The signal from the DC removal circuit 15 is supplied to a postcomb and slicer 16, to an AGC circuit 17, which supplies gain up and gain down voltages to block 12, and to frame sync recovery circuit 26 and segment sync recovery circuit 27. The postcomb includes a filter for minimizing interference from co-channel NTSC signals. The output of the postcomb and slicer 16 is coupled to an equalizer and phase tracker 18, where the signal is equalized, to compensate it for tracking errors in a well known manner, and is phase tracked in a manner described in U.S. Pat. No. 5,406,587, for example. The equalizer supplies the signal to an MPEG-2 (Motion Picture Experts Group) Transport Decoder 20 where numerous operations are performed including compensating for precoding of the signal, symbol decoding to convert the data into byte or word form, convolutional deinterleaving of the data, forward error correction and derandomization of the data, and conversion into video and audio data streams. The output of block 20 is further processed in a well known manner for reproducing the video and accompanying audio in the received digital television signal. A timing block 24 receives information from the sync recovery circuits 26 and 27 and provides timing signals, by counting down from the symbol frequency, for use in recovering the data. A field segment reference generator 28, controlled by timing block 24, generates a reference for every data segment, at the appropriate time as determined by segment sync recovery, that corresponds to the known field sync signal in the first segment of each field. The reference for every data segment, as will be seen, is used for determining the first data segment (i.e., the segment most resembling the reference) in each field and, in accordance with the invention, the number one data segment in each frame. The frame sync recovery circuit 26 functions, as will be described below, to produce a Fld/Fr (field/frame) lock signal when both field and frame synchronization have been attained.

Figure 2:
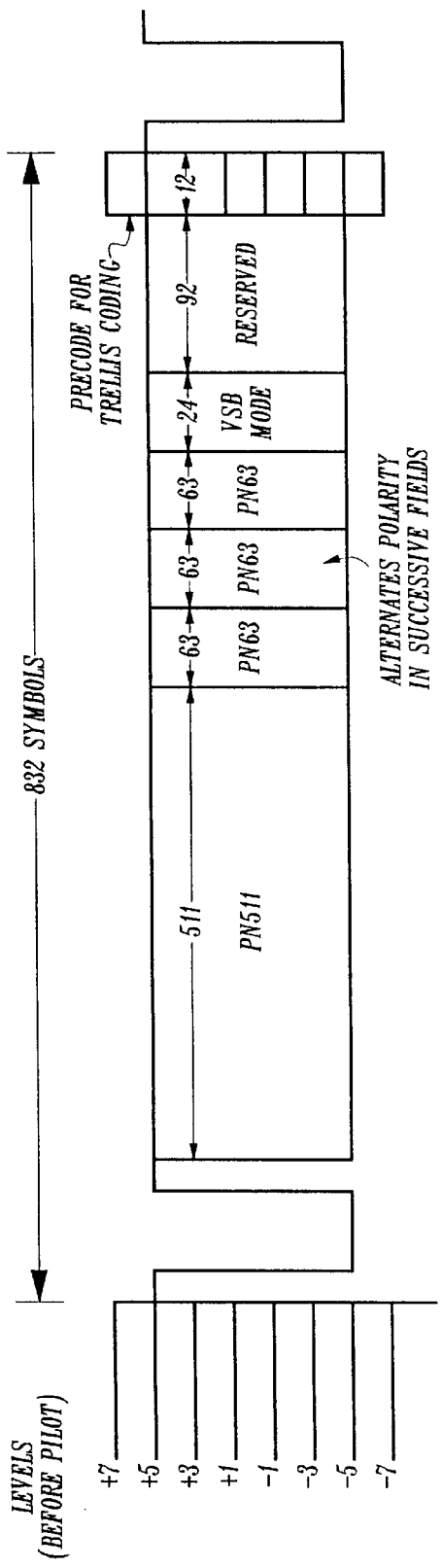
FIG. 2 illustrates a field segment sync signal with one long and three short PN sequences.

FIG. 2 illustrates the arrangement of a field sync data segment and the corresponding symbol levels, which range from −7 to +7. A four-symbol data segment sync is followed by a 511 PN sequence that in turn is followed by three 63 PN sequences, with the middle one of the three 63 PN sequences alternating in polarity in successive fields. The alternating polarity 63 PN sequence is used to identify the two fields in accordance with the present invention. The 24 symbol VSB mode, the 92 reserved symbols and the 12 precode symbols need not be discussed in connection with this invention. It should be noted that the output of segment field reference generator 28 duplicates the field sync segment for every segment illustrated in FIG. 2, with suitable modifications to compensate for the effects of the filter 16 (if used) on the symbol levels. Also, it should be understood that the reference only matches one of the polarities of the middle 63 PN sequences.

FIG. 3 depicts a simplified schematic diagram of a frame sync recovery circuit constructed in accordance with the invention. Timing block 24 receives an input from a symbol counter, which has been synchronized to the received signal in accordance with the teaching of U.S. Pat. No. 5,416,524, an input from a segment counter 42 and a frame signal Fr input. Timing block 24 generates a field polarity enable signal FldPolEn, a 1 field signal Fld1S, a pair of gating signals Egate and EClr, a field signal Fld, a frame reset signal FR, a segment error enable signal SegErrEn, a segment field reference load signal, SegFldRefLd and a system reset signal SMR. A comparator 30 is supplied with a two-bit signal from slicer 16 (or a sign bit) and the segment field reference signal from reference generator 28. The output of comparator 30 is supplied to one input of an AND gate 32, the other input of which is supplied with the gating signal Egate. Reference generator 28 is synchronized by the signal SegFldRefLd to load the reference at the appropriate time to coincide with each arriving data segment. The reference is compared with each data segment in comparator 30, but only a portion of the comparison is used as determined by Egate. Gate 32 supplies an error counter 34 that is cleared by the signal EClr. Error counter 34 functions to count disagreements (errors) between the comparisons of the individual symbols of the reference and the incoming signal. The output of error counter 34 is coupled to a pair of circuit arrangements for finding the least number of errors between the compared signal portions. As will be seen, one compared portion is the 511 PN sequence and the other is the middle 63 PN sequence. The 511 PN sequence compared portion is processed by a comparator 36 and two registers 38 and 40, in the form of D flip/flops. (The 63 PN sequence compared portion is processed by a similar combination of a comparator 74 and a pair of registers 72 and 76.) Those skilled in the art will appreciate that the comparison is not to be limited to the 511 sequence—the invention also contemplates comparing the first or last PN 63 sequence with the middle sequence in each field. Register 40 is reset by EClr and enabled by SegErrEn. The Q output of register 40 is coupled to the enable input of register 38 and the enable input of a register 44 that is supplied from outputs of segment counter 42. Segment counter 42 is supplied with inputs of symbol clock, a symbol enable signal Sen and a master reset signal MR. As its name implies, segment counter 42 counts the segments (1 to 313) in the received signal on a field basis.

Segment counter register 44 has its Q output coupled to the D input of another register 46, the Q output of which supplies one input each of a pair of comparators 48 and 50. The other inputs of the comparators 48 and 50 are supplied from the segment counter 42 and the Q output of register 44, respectively. The output of comparator 50 is coupled to a field confidence counter 52 that is enabled by the Fld signal and cleared by a signal from an AND gate 64 which receives inputs of an optional segment lock signal and a channel change signal. Field confidence counter 52 has a first output coupled to a four input AND gate 54, a second output coupled to an inverter 60, a third output coupled to the R input of an RS flip/flop 66 and to an AND gate 68, and a fourth output coupled to the S input of an R-S flip/flop 66 and to an AND gate 45. The Fld1S signal is applied to the other input of AND gate 45 and as a reset signal to register 38. The output of AND gate 45 enables register 46 and R-S flip/flop 66.

Another input to four input gate 54 is supplied from the output of comparator 48. A third input to the gate is the system master reset signal SMR from timing block 24. The fourth input is from the Q output of a flip/flop 58, which in conjunction with a flip/flop 56 constitutes a "one time" circuit. A preset from the field confidence counter 52 is supplied to flip/flop 58 through inverter 60. Flip/flop 58 is enabled from the Q output of flip/flop 56, which develops the MR signal.

The FldPolEn signal is applied to a one-symbol-delay flip/flop 70 and to the enable input of register 76. The Q output of flip/flop 70 is coupled to the enable input of register 72. The Q output of register 76 is coupled to one input of an exclusive NOR gate 78, the output of which drives a frame confidence counter 84. Frame confidence counter 84 is enabled from the Q output of a flip/flop 82, the D input of which receives the Fld signal. The output of frame confidence counter 84 is coupled to gate 68 and the T input of a T type flip/flop 80, the frame signal Fr output of which is coupled to gate 78.

Figure 4:
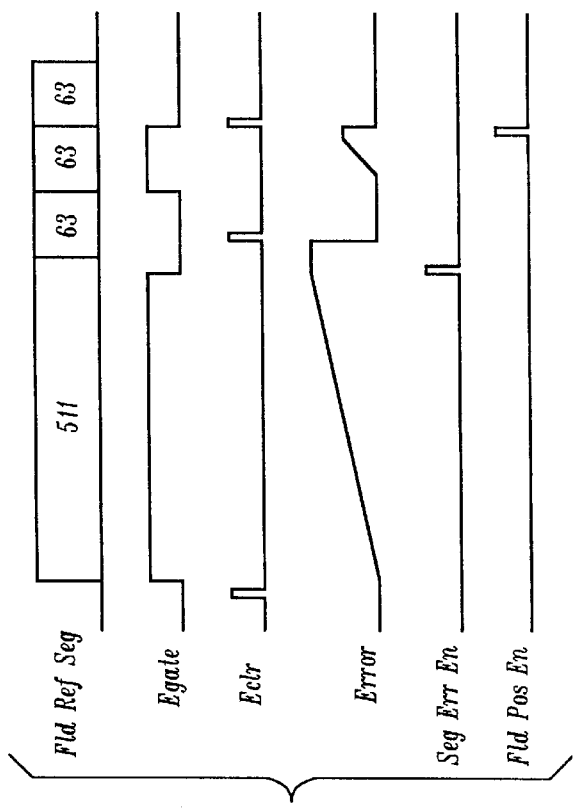
FIG. 4 is a series of waveforms useful in explaining the operation of the circuit of FIG. 3.

In explaining the operation of the circuit, reference to the diagrams in FIG. 4 will be helpful. The arrangement determines the first data segment (which contains the field sync signal) in each field by successively comparing each data segment with the reference from generator 28. The comparison is on a symbol by symbol basis and is performed in comparator 30. The Egate signal in FIG. 4 clocks gate 32 so that only the comparisons corresponding to the 511 PN sequence and the middle 63 PN sequences are used. Every 313 segments, register 38 is loaded with a preset that is larger than the maximum error count that can occur for any segment. This corresponds to each compared symbol being in error with the reference and in the preferred embodiment is equal to hexadecimal 1FF. As the errors in each segment are counted, the value in register 38 is changed only when a segment error less than the stored value is found. Since the preset value is larger than the number of possible errors in a segment, the value in register 38 is always changed on the initial segment comparison. Thereafter, the value in the register 38 is only changed when a segment with fewer errors is encountered in the group of 313 segments. At the end of each group of 313 segments, and in the absence of noise, register 38 should contain the smallest error count, corresponding to the number 1 segment in the field. This is so since it contains the field sync which is identical to the generated reference.

The signal EClr resets the error counter 34 before and after Egate and the error build up during the 511 PN sequence comparison is illustrated by the error curve. The lowest value of accumulated errors in register 38 is paired with the corresponding segment number provided by segment counter 42 and this segment becomes the number 1 segment when the segment counter is cleared by the MR reset signal.

The field confidence counter is incremented whenever the segment with the least number of errors in a succeeding field is identified as the corresponding segment in the preceding field. The FldPolEn signal is used to make the 63 PN sequence comparison. The comparison circuitry consists of flip/flop 70, registers 72 and 76 and comparator 74. While the comparison is always being made, the measurement is only considered when the frame counter is released. As seen in FIG. 4, the FldPolEn pulse samples only the results of the middle 63 PN sequence comparison and ignores the 511 PN sequence comparison. Therefore only the first segments in each field are compared with each other and the one with the least number of errors can readily be determined since the polarity of the middle 63 PN sequence in the reference field segment is fixed. Thus the actual number 1 segment in the frame can be distinguished from the number 314 segment in the frame. The determination of the frame is used to increment the frame confidence counter 68 which, after one identification, results in generation of the Fld/Fr lock signal, indicating that field and frame lock have been attained.

It will be appreciated by those skilled in the art that the presence of postcombing will require a change in the start of Egate to assure that the effect of the postcombing on the first group of symbols in the compared 511 PN sequences is discarded.

To summarize, the errors or disagreements per segment are compared with the reference to determine the segment that contains the smallest number of errors. At the beginning of each group of 313 segments the register 38 is loaded with a maximum value to insure that a lower value will be found in the very first segment compared. Thereafter any new error value less than the stored value in register 38 replaces the stored value. The segment number containing the least number of errors in the field is then stored in segment register 46.

On the next field, if the segment number in which the minimum error value was found agrees with the segment number for the previous field, the field confidence counter counts up. If the segment number is different, the confidence counter counts down. The determined segment number is only changed when the confidence counter reaches zero, which also occurs via a reset whenever a channel change occurs. When the field confidence counter reaches a count of two, the frame confidence counter is enabled. Field lock is attained when the field confidence counter attains a count of four. The field confidence counter counts up to a maximum of 16, where the count is held, i.e., not rolled over.

The frame confidence counter 84 counts up when the T flip/flop 80 is in phase with the output of comparator 36. When the frame confidence counter reaches a count of one, frame lock is attained and the combined field and frame lock conditions generate the field and frame lock signal Fld/Fr.

When the field confidence counter reaches a count of two, the segment counter reset circuitry is enabled. The segment counter 42 is reset when the segment number for the present field agrees with the segment number stored in register 46. At this time, the least error segment number stored in register 46 becomes number one. The master reset signal MR loads register 46 with 001 and the one shot reset circuit prevents a reset from occurring again unless the confidence counter has counted down to zero and back up to two.

Finally, comparator 74 compares the results of the error counter 34 measuring the middle 63 PN sequence with those obtained a field earlier. In field 1 of the two field frame a minimum error value is obtained, whereas in field 2 of the frame a maximum error value is obtained because the middle 63 PN sequence is inverted from that of the reference field segment middle 63 PN sequence. Therefore, field 1 is distinguishable from field 2.

What has been described is a novel arrangement for determining the first field of a two field frame. It is recognized that numerous changes in the described embodiment of the invention will occur to those skilled in the art without departing from its true spirit and scope. The invention is to be limited only as defined in the claims.

What is claimed is:

1. A method of identifying first and second fields in a frame of segments where each field includes slightly different sync information in a corresponding one of its segments, comprising:

comparing each of the segments to a reference segment to identify the segments with the sync information in each field; and comparing the sync information in the identified segments with a corresponding portion of the reference segment to identify the first and second fields based upon differences in the sync information.

2. The method of claim 1, wherein the segments comprise multilevel symbols and wherein the comparing comprises comparing individual symbols in the reference segment with the symbols in the sync information.

3. The method of claim 2, further comprising determining the segments with the sync information and identifying the first and the second fields by the least number of symbol errors found in the comparisons.

4. A method of identifying first and second fields in a frame of repetitive data segments where each field includes an identical long PN sequence and slightly different short PN sequences in corresponding ones of its segments, comprising:

comparing the portion of each segment that would coincide with the long PN sequence to a reference segment to find the one segment in each field with the PN sequences; and comparing the short PN sequences in the found segments with a coinciding portion of the reference segment to identify the first and second fields.

5. The method of claim 4, wherein the data segments comprise multilevel symbols and wherein the comparisons are performed on a symbol by symbol basis, and further comprising:

determining the segment with the PN sequences by finding the compared segment with the least number of symbol errors compared with the reference segment.

6. The method of claim 5, wherein the short PN sequences in successive fields have opposite polarities and wherein the reference segment coinciding portion has a fixed polarity.

7. In combination:

means for receiving data in the form of two fields of repetitive data segments with a corresponding one data segment in each field each including a first data sequence and a second data sequence, said first data sequences being identical and said second data sequences being different;

a reference data sequence having a first portion identical to said first data sequence and a second portion identical to one of said second data sequences;

first means for comparing said data segments with said first portion of said reference data sequence to identify said one first segment in each of said fields; and second means for comparing said second data sequences in said identified first data segments with said second portion of said reference data sequence to identify the individual fields.

8. The combination of claim 7 wherein said data segments comprise multilevel symbols and wherein said first and said second comparing means compare individual symbols in said first and second data sequences with corresponding symbols in said reference data sequence.

9. The combination of claim 8, further including:

an error counter for counting symbol errors;

register means for recording the least number of symbol errors in a data segment and for storing the corresponding segment number in each said field; and signal means for restricting operation of said error counter to said first and second portions.

10. The combination of claim 9 wherein said first data sequence is relatively long and said second data sequence is relatively short, with said second data sequences alternating in polarity in successive fields, and further comprising:

means for enabling said first comparison means during occurrence of said relatively long first data sequence and for enabling said second comparison means during occurrence of said relatively short second data sequence.

11. The combination of claim 10 further including:

a field confidence counter:

a frame confidence counter; and means for incrementing said confidence counters responsive to successive identical determinations of said first segments in each of said fields and in response to successive identical determinations of the identities of each of said fields.

12. A frame identification system for identifying the individual fields of a two field frame comprising:

means for receiving successive fields of repetitive data segments each comprising multilevel symbols, with the first data segment in each field including a long and a short data sequence functioning as a field sync signal, said short data sequences having opposite polarities in successive fields;

means for generating a reference data segment having first and second portions corresponding to said long and short data sequences, said reference data segment having only one polarity for said second portion;

first comparison means for comparing symbols in said first portion of said reference data segment with said long data sequences in each of said data segments;

second comparison means for comparing symbols in said second portion of said reference data segment with said short data sequences in each of said data segments;

error means for determining from said first and said second comparison means, the first data segment in each field based upon finding the data segment with the lowest number of symbol errors in each field;

means for operating said error means for determining among said first data segments in each successive pair of fields the first data segment having the lowest number of symbol errors in said second data sequences; and means for identifying said lowest symbol error first data segment as the first data segment in said frame.

* * * * *